United States Patent

Taylor et al.

[15] 3,644,834

[45] Feb. 22, 1972

[54] FREQUENCY DIVIDER CIRCUITS

[72] Inventors: John Harry Taylor, Cheddar, Somerset; Roger Stephen Harris, Wells, Somerset, both of England

[73] Assignee: Electric & Musical Industries Limited, Hayes, Middlesex, England

[22] Filed: Mar. 27, 1970

[21] Appl. No.: 23,341

[30] Foreign Application Priority Data

Mar. 29, 1969 Great Britain......................16,577/69

[52] U.S. Cl................................328/46, 307/225, 307/273, 307/228, 307/292

[51] Int. Cl.........................................................H03k 25/06

[58] Field of Search....................328/46; 307/225, 273, 228, 307/292

[56] References Cited

UNITED STATES PATENTS

| | | | |
|---|---|---|---|
| 3,144,581 | 8/1964 | Greenburg et al. | 307/225 X |
| 3,317,843 | 5/1967 | Emmons | 307/225 X |
| 3,351,781 | 11/1967 | Johnson | 307/225 |
| 3,382,375 | 5/1968 | Dischert | 307/225 |
| 3,454,788 | 7/1969 | Tyler et al. | 307/273 X |

*Primary Examiner*—John S. Heyman
*Attorney*—William W. Downing, Jr.

[57] ABSTRACT

A frequency divider circuit for producing an output signal from an input signal of periodicity *t* is provided, including means for deriving an intermediate signal which defines alternate intervals N·*t* and M·*t*., where N and M are integers, means for extending the ends of alternate intervals by P·*t*/2., where P is an odd integer, so as to produce a further intermediate signal, and means for generating said output signal in response to said further intermediate signal. Such a frequency divider circuit is disclosed which is adapted for providing field synchronizing pulses from line frequency pulses.

7 Claims, 9 Drawing Figures

FREQUENCY DIVIDER CIRCUITS

Figure 1:
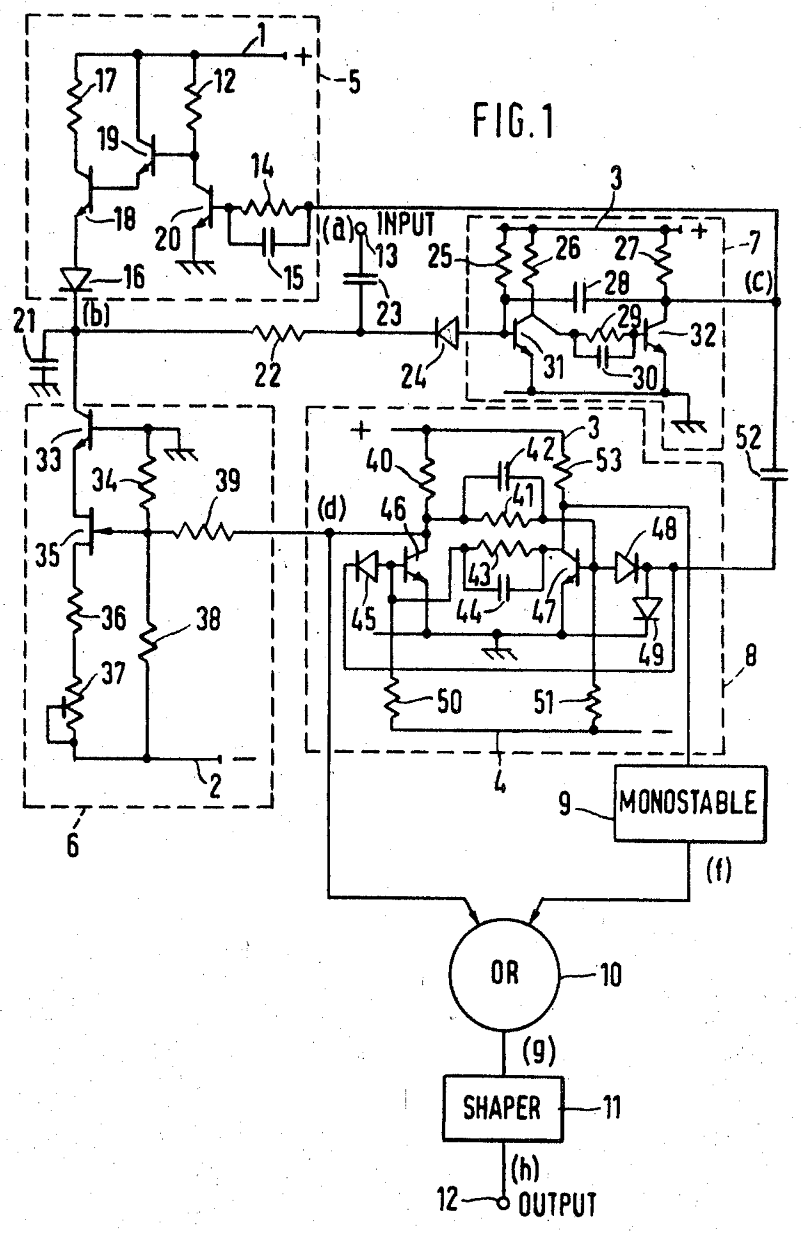

The present invention relates to frequency divider circuits, especially, but not exclusively, to frequency divider circuits for generating field synchronizing pulses for field interlaced television systems.

In a known type of broadcast television system, line and field synchronizing pulses are derived, by means of frequency divider circuits, from a common source of pulses which are at twice the line frequency. In this type of system the division ratio of the field divider circuit is large, and in order to maintain satisfactory field interlacing it must remain constant. Hence field divider circuits for this type of system in general consist of several cascaded divider stages each of small division ratio, for example four divide by five stages, in order to avoid the difficulty of obtaining a large constant division ration in a single divider.

For industrial television a lower standard of field interlacing than that required for broadcast television is often accepted in order to avoid the cost of broadcast television type multistage dividers, by the adoption of so-called "random interlace" systems in which there is no fixed timing relationship between the frequencies of line and field synchronizing pulses. However even for industrial television consistent interlacing is desirable, and therefore for industrial television in particular, there is a need for field divider circuits which enable consistent field interlacing to be maintained and which are cheaper than the known broadcast-type dividers referred to above.

Accordingly one object of the present invention is to provide a frequency divider circuit which enables a relatively large division ratio to be obtained in a single stage.

A further object of the present invention is to provide a frequency divider circuit for generating field synchronizing pulses for a television system, which despite changes in division ratio maintains field interlacing.

According to the present invention there is provided a frequency divider circuit for producing from input signals of periodicity $t$, output pulses of greater periodicity, including a. means responsive to said input pulses for deriving intermediate pulses, each intermediate pulse defining an interval $N \cdot t$ and being separated from the preceding intermediate pulse by $M \cdot t$ where M and N are integers,
b. means for extending the end of each intermediate pulse by an interval $P/2 \cdot t$, and P is an odd integer, so as to derive further intermediate pulses, and
c. means for deriving a relatively short pulse in response to the leading and trailing edge of each of said further intermediate pulses thereby to generate said output pulses, the leading edges of said output pulses defining alternate intervals $(N+P/2)t$ and $(M-P/2)t$.

According to a preferred form of the present invention there is provided a frequency divider circuit for television, for deriving field synchronizing pulses from line frequency pulses of line periodicity $t$, including a. a relaxation circuit,
b. a monostable circuit,
c. means for utilizing a line frequency pulse to initiate a return stroke of said relation circuit when a return stroke reaches a predetermined level
d. means for triggering said monostable circuit in response to an input pulse when a return stroke of said relaxation circuit reaches said predetermined level,
e. a bistable circuit,
f. means for triggering said bistable circuit in response to the leading edge of each pulse from said monostable circuit, the pulses from one output of said bistable circuit constituting intermediate pulses,
g. means for controlling said relaxation circuit so that each intermediate pulse defines an interval $N \cdot t$ and is separated from the preceding intermediate pulse by an interval $M \cdot t$, where $N$ and $M$ are integers and $M=N+1$,
h. means for extending the end of each of said intermediate pulses by half a line period, so as to device further intermediate pulses, and
i. means for deriving a field synchronizing pulse in response to the leading and trailing edge of each of said further intermediate pulses, the field synchronizing pulses being of periodicity $(N+½)t$ for producing odd-line interlaced scanning.

Figures 2A, 2B, 2C, 2D, 2E, 2F, 2G, 2H:
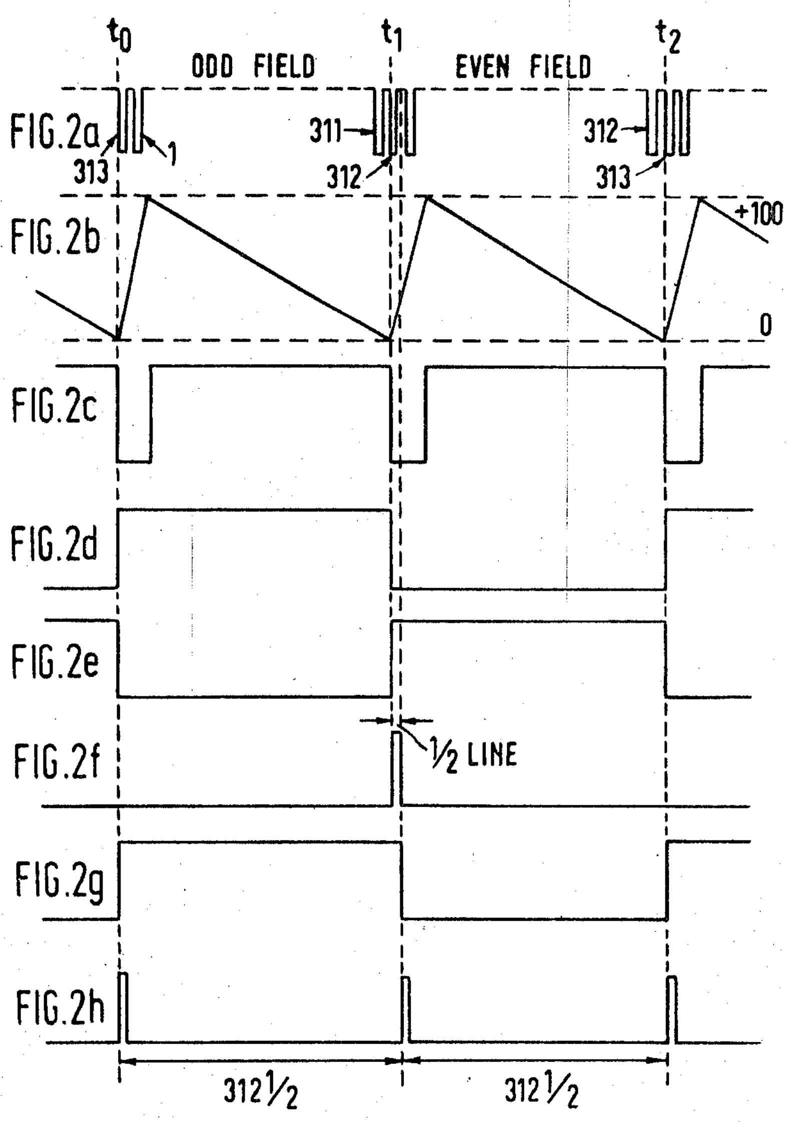

In order that the present invention may be clearly understood and readily carried into effect, it will now be described with reference to the accompanying drawings, in which:

FIG. 1 shows partly in block diagrammatic form a frequency divider circuit in accordance with the one example of the present invention for generating field synchronizing pulses from line synchronizing pulses, and FIGS. 2($a$) to 2 ($h$) show signal waveforms which appear at the points correspondingly indicated in the circuit shown in FIG. 1.

The divider circuit shown in FIG. 1 has an input terminal 13 to which line pulses at a frequency of 15,625 c./s. are applied as indicated in FIG. 2($a$), and an output terminal 12 at which field pulses at a frequency of 50 c./s. are produced as shown in FIG. 2($h$). Hence its overall division ration is 312½, and corresponds to that required for field interlacing in a 625 line television system.

In FIG. 1 the circuits shown in outlines 5 and 6 are respectively for rapidly charging and relatively slowly discharging a capacitor 21 so as to generate across it the short and long strokes respectively of the sawtooth waveform shown in FIG. 2($b$). The cathode of a diode 24 is coupled by a resistor 22 to the capacitor 21, and also by a capacitor 23 to the terminal 13. The anode of diode 24 is coupled to the input of a monostable circuit within the outline 7. The time constant of capacitor 23 and resistor 22 is arranged to be relatively short, so that a signal comprising substantially differentiated line input pulses superimposed on a sawtooth waveform determines the cathode potential of the diode 24.

The monostable circuit within the outline 7 includes transistors 31 and 32 which have earthed emitters and respective collector load resistors 26 and 27 connected to a positive supply line 3. The collector of the transistor 32 is connected by a capacitor 28 to the base of the transistor 31, and a resistor 25 connects the anode of the diode 24 and the base of the transistor 31 to the supply line 3. A resistor 29 and a capacitor 30 couple the collector of the transistor 31 to the base of the transistor 32 in known manner to complete the regenerate loop of the monostable circuit 7. In its untriggered condition, the base/emitter junction of the transistor 31 is biassed into conduction by resistor 25 so that the anode of the diode 24 is held near earth potential, and the transistor 32 is held substantially nonconducting by the small bias potential applied to its base by the collector of the transistor 31. Hence triggering of the monostable circuit 7 occurs only when the sawtooth waveform shown in FIG. 2($b$) has fallen sufficiently for a superimposed line input pulse to carry the cathode potential of the diode 24 below its anode potential. When triggered the monostable circuit 7 produces negative going pulses as shown in FIG. 2($c$) at the collector of the transistor 32, the width of these pulses being governed by the time constant of capacitor 28 and resistor 25.

The circuit within outline 5 includes a grounded emitter amplifying stage comprising a transistor 20 with its collector coupled to a large positive voltage supply line 1, for example of 100 volts, by a load resistor 12, and its base coupled to the collector of the transistor 32 by a capacitor 15 shunted by a resistor 14.

The collector of the transistor 20 is directly connected to the base of a transistor 19 having its collector connected to the supply line 1, and its emitter connected to the base of a transistor 18. A diode 16 couples the emitter of the transistor 18 to the capacitor 21, and a current limiting resistor 17 of relatively small value couples the collector of transistor 18 to the supply line 1. In the untriggered state of the monostable circuit 7, the voltage across the capacitor 21 is above earth potential and the transistor 20 is biassed into conduction by the collector potential of the transistor 32. In this condition the collector of the transistor 20 is near earth potential and insufficient to bias the transistors 18 and 19 and diode 16 into conduction. Hence no charging current is fed by the emitter of the transistor 18 to the capacitor 21, and the diode 16 limits reverse base/emitter current of the transistor 18 to a low level. When the monostable circuit 7 is triggered, the negative pulse which appears at the collector of the transistor 32 turns off the transistor 20 and causes transistors 18 and 19 and the diode 16 to conduct so that the capacitor 21 is rapidly charged to substantially the potential of the supply line 1 via the low emitter output impedance of the transistor 18.

The circuit within outline 6 includes a grounded base transistor 33 having the capacitor 21 connected to its collector, and a *n*-channel depletion-type filed effect transistor 35 connected in its emitter circuit to provide negative feedback for stabilizing its collector current, and hence the discharge current of the capacitor 21. The field effect transistor 35 is operated in its pinchoff region to provide a high drain to source dynamic impedance which remains substantially constant with temperature. The source electrode of the transistor 35 is connected to a negative supply line 2, for example of 120 volts, via feedback resistors 36 and 37, the resistor 37 being adjustable to enable the division ratio of the divider circuit to be adjusted. A voltage divider comprising resistors 34 and 38 connected in series between the supply line 2 and earth provide at their junction a fixed bias for the gate electrode of the transistor 35, and a resistor 39 connected to an output of a bistable circuit within the outline 8 provides a variable bias for the gate electrode of the transistor 35. The latter variable bias follows the waveform shown in FIG. 2(*d*) and effects a change in the source to drain impedance of the transistor 35 at the end of each field, and hence a change in the collector current of the transistor 33.

The bistable circuit 8 includes two transistors 46 and 47 with earthed emitters which conduct alternately in response to the leading edges of pulses at the collector of the transistor 32. A capacitor 52 couples the collector of the transistor 32 to the bases of the transistors 46 and 47 in known manner by means of steering diodes 45 and 48, and a diode 49 which enables rapid recovery of the charge on the capacitor 52 between pulses. The transistors 46 and 47 have collector load resistors 40 and 53 respectively connected to the positive supply line 3, base bias resistors 50 and 51 respectively connected to a negative bias supply line 4, and resistor/capacitor combinations 41/42 and 43/44 cross-coupling their base/collector electrodes in known manner. The collector of the transistor 46 provides an output signal as shown in FIG. 2(*d*) which is coupled by resistor 39 to the gate electrode of the transistor 35 to control the rate of discharge of capacitor 21 during odd and even fields by the circuit 6. An output signal of the form shown in FIG. 2(*e*) is generated at the collector of the transistor 47 in response to triggering of the bistable circuit 8.

The circuit described so far with reference to FIG. 1 operates in the following manner in response to line pulses as shown in FIG. 2(*a*) applied to the terminal 13. Assume that the capacitor 21 has been positively charged with respect to earth potential, and that it is being linearly discharged as shown at the beginning of the waveform in FIG. 2(*b*) by the circuit 6. Then the diode 24 is nonconducting, output signals are provided by the untriggered monostable circuit 7 and bistable circuit 8 as shown in FIGS. 2(*c*) to 2(*e*) prior to time $t_o$, and no charging current is provided by the circuit 5 to the capacitor 21. With resistor 37 appropriately adjusted, the threshold of the diode 24 is exceeded and the monostable circuit 7 triggered at time $t_o$ produce a line pulse (numbered 313) as shown in FIG. 2(*a*). When triggered the monostable circuit 7 emits a negative going pulse as shown in FIG. 2(*c*), which is applied to the circuit 5 and the bistable circuit 8. Hence at time $t_o$ the output signals of the bistable circuit 8 change as shown in FIGS. 2(*d*) and 2(*e*), the signal shown in FIG. 2(*d*) comprising the intermediate pulses referred to above, and for the duration of the first pulse shown in FIG. 2(*c*) the capacitor 21 is rapidly charged by the circuit 5 to produce the first short stroke shown in FIG. 2(*b*). Upon cessation of the pulse from the monostable circuit 7, the circuit 5 ceases to charge the capacitor 21. The capacitor 21 then linearly discharges during the first odd field shown in FIG. 2(*a*) at a greater rate than during the previous field due to the more positive bias applied to the gate electrode of the transistor 35 by the collector of the transistor 46. By suitably proportioning the latter bias the monostable circuit 7 is triggered in response to the threshold of the diode 24 being exceeded at time $t_1$ by the 312th line input pulse which occurs during the first odd field shown in FIG. 2(*a*). When triggered at time $t_1$ the monostable circuit 7 effects rapid charging of the capacitor 21, and the triggering of the bistable circuit 8 as previously described, but in this case the bias applied by the bistable circuit 8 to the gate electrode of the transistor 35 is reduced. Thus during the even field shown in FIG. 2(*a*) the discharge rate of the capacitor 21 is such that the monostable circuit 7 is triggered by the 313th line pulse at time $t_2$. It should now be apparent that the leading edges of the pulses shown in FIG. 2(*c*) correspond in timing to a division ratio of 312 during odd fields, and a division ratio of 313 during even fields with respect to line input pulses, and that these leading edges determine the timing of transitions in the output pulses (FIGS. 2(*d*) and 2(*e*)) of the bistable circuit 8.

Referring now to the remainder of the circuits shown in FIG. 1, the output pulses of the bistable circuit 8 (FIG. 2(*e*)) are applied to the input circuit of a monostable 9 which includes a differentiating circuit so that triggering occurs only in response to positive going transitions in the waveform shown in FIG. 2(*e*). When triggered the monostable 9 is arranged to apply a pulse of width equal to one-half line period (FIG. 2(*f*)) to one input of an OR-gate 10. The other input of the OR-gate 10 is connected to the collector of the transistor 46 so that a signal of the form shown in FIG. 2(*g*) is produced at the output of the OR-gate 10 in response to the input signal waveforms shown in FIG. 2(*f*) and 2(*d*). Thus the pulses in the waveform shown in FIG. 2(*g*) comprise the further intermediate pulses referred to above. Hence the time between adjacent transitions in the waveform shown in FIG. 2(*g*) corresponds to the period of 312½ line input pulses. The output of the OR-gate 10 is applied to a shaper 11 which comprises a monostable circuit which responds to positive and negative going transitions in the waveform shown in FIG. 2(*g*) and generates field output pulses as shown in FIG. 2(*h*) at the output terminal 12, the timing of which is as required for field interlacing.

With regard to stability of the above described divider circuit, variations with temperature of the base/emitter characteristic of the transistor 33 and the conduction characteristic of the diode 24 tend to cancel, and as previously stated the discharge current for capacitor 21 during any field is held substantially constant by the field effect transistor 35. The main remaining components affecting stability are the capacitor 21 and the resistors 36 and 37, but if these are high stability types with regard to temperature, no change in division ratio occurs over a wide range of operating temperature.

One advantage of the circuit shown in FIG. 1 is that if sufficient slow drift takes place for example for the 311th line pulse in odd fields to trigger the monostable circuit 7, then a similar order of drift occurs during even fields so that the monostable 7 is triggered by the 312th line pulse in each even field. In this case satisfactory field interlacing is still maintained by the half line period pulse produced by the monostable 9, but the number of lines in each field is reduced to 311½. The change in division ratio occurs abruptly and there is very little visible change in a reproduced picture apart from the reduction in the number of lines by two. Similarly, if the division ratio decreases further or increases, there is very little visible change in a reproduced picture apart from a loss or gain of two lines at each change in division ratio.

A further advantage of the present invention is that in a similar manner to that described with reference to drifts in division ratio, field interlacing is maintained even if the frequency of the line pulses applied to the input terminal 13 drifts, line frequency drift merely increasing or decreasing the number of lines in a reproduced picture. However in practice there is little difficulty in stabilizing the frequency of line pulses fed to the divider so that these changes do not occur.

If it is desired to lock the frequency of the field pulses generated by the circuit shown in FIG. 1 to some reference source e.g., 50 c./s. mains, the field output pulses and reference signals may be fed to a known type of frequency comparator and its output signal coupled to the base of the transistor 35 to control the discharge rate of the capacitor 21 and hence the frequency of the field output pulses.

It will be appreciated that the invention is not limited to the circuit shown in FIG. 1. For example it is not necessary for the circuit 6 to provide different discharge currents for the capacitor 21 during odd and even fields if the television scanning equipment which responds to the field pulses is DC coupled. In this case the resistor 39 can be disconnected and resistor 37 adjusted so that the monostable circuit 7 is triggered in response to the passage of the same number of line pulses in each field e.g., 312. The field pulses at the terminal 12 will then be spaced alternately by periods corresponding to 311½ and 312½ line input pulses so that the odd and even fields in a reproduced picture will differ by one line, but correct interlacing will be maintained. Also other means than the monostable 9 can be provided for producing pulses of width equal to one half line period, e.g., the waveform shown in FIG.2(*e*) can be fed to a differentiating type of circuit and the positive going pulses in its output amplified and limited to produce pulses of the required width. Furthermore instead of varying the discharge rate of capacitor 21, its charge time can be varied to be say alternately one or two lines by coupling the collector of transistor 46 to the base of transistor 31.

We claim:

1. A frequency divider circuit for producing from input signals of periodicity $t$, output pulses of greater periodicity, including a means responsive to said input pulses for deriving intermediate pulses, each intermediate pulse defining an interval $N \cdot t$ and being separated from the preceding intermediate pulse by $M \cdot t$ where M and N are integers, b. means for extending the end of each intermediate pulse by an interval $P/2 \cdot t$, where P is an odd integer, so as to derive further intermediate pulses, and c. means for deriving a relatively short pulse in response to the leading and trailing edge of each of said further intermediate pulses thereby to generate said output pulses, the leading edges of said output pulse defining alternate intervals $(N+P/2)t$ and $(M-P/2)t$.

2. A frequency divider circuit according to claim 1 wherein said means for deriving said intermediate pulses includes a. a relaxation circuit, b, means for utilizing an input pulse to initiate a return stroke of said relaxation circuit when a return stroke reaches a predetermined level, c. means for deriving an intermediate pulse from alternate return strokes of said relaxation circuit, and d. means for controlling said relaxation circuit so that each such intermediate pulse defines an interval $N \cdot t$, and is separated from the preceding intermediate pulse by an interval $M \cdot t$.

3. A frequency divider circuit according to claim 2 wherein said means for deriving an intermediate pulse from alternate return strokes of said relaxation circuit includes a. a monostable circuit, b. means for triggering said monostable circuit in response to an input pulse when a return stroke of said relaxation circuit reaches said predetermined level, c. a bistable circuit, and d. means for triggering said bistable circuit in response to the leading edge of each pulse from said monostable circuit, the pulses from one output of said bistable circuit constituting said intermediate pulses.

4. A frequency divider circuit according to claim 3 wherein said means for extending the end of each of said intermediate pulses includes a. means for deriving a pulse of duration $Pt/2$ from the trailing edges of the pulses from the other output of said bistable circuit, and b. means for adding said pulses of duration $Pt/2$ to the trailing edges of said pulses of duration Nt constituting said intermediate pulses.

5. A frequency divider circuit according to claim 1 wherein said integer $M$ is equal to $N+1$, and said integer $P$ is equal to 1.

6. A frequency divider circuit according to claim 1 wherein said integers $N$ and $M$ are equal, and said integer $P$ is equal to 1.

7. A frequency divider circuit for television for deriving field synchronizing pulses from line frequency pulses of line periodicity $t$, including a. a relaxation circuit, b. a monostable circuit, c. means for utilizing a line frequency pulse to initiate a return stroke of said relaxation circuit when a return stroke reaches a predetermined level, d. means for triggering said monostable circuit in response to an input pulse when a return stroke of said relaxation circuit reaches said predetermined level, e. a bistable circuit, f. means for triggering said bistable circuit in response to the leading edge of each pulse from said monostable circuit, the pulses from one output of said bistable circuit constituting intermediate pulses, g. means for controlling said relaxation circuit so that each intermediate pulse defines an interval $N \cdot t$ and is separated from the preceding intermediate pulse by an interval $M \cdot t$, where $N$ and $M$ are integers and $M=N+1$, h. means for extending the end of each of said intermediate pulses by half a line period, so as to derive further intermediate pulses, and i. means for deriving a field synchronizing pulse in response to the leading and trailing edge of each of said further intermediate pulses, the field synchronizing pulses being of periodicity $(N+½)t$ for providing odd-line interlaced scanning.

* * * * *